United States Patent

[11] 3,624,094

[72] Inventors Jean A. Gautier;
Marcel Y. Miocque; Henri Moskowitz; Janine L. Blanc-Guenee; Guy M. Raynaud; Micheline Y. Sergant, all of Paris, France
[21] Appl. No. 859,168
[22] Filed Sept. 18, 1969
[45] Patented Nov. 30, 1971
[73] Assignee Delalande S.A.
Courbevoie (Hauts-de-Seine, France
[32] Priorities Nov. 15, 1968
[33] France
[31] 173828;
Feb. 12, 1969, France, No. 183251

[54] ALPHA-[(PHENYL SULFINYL)METHYL]-ALPHA-PHENYL DERIVATIVES OF PYRIDINEMETHANOLS
2 Claims, No Drawings

[52] U.S. Cl. .................................................. 260/294.8 F,
260/332.3 R, 260/576, 260/577, 260/607 A,
260/999
[51] Int. Cl. ..................................................... C07d 31/48
[50] Field of Search ........................................... 260/294.8 F

[56] References Cited
FOREIGN PATENTS
43/07786  3/1968  Japan ........................... 260/294.8

Primary Examiner—Alan L. Rotman
Attorney—Woodhams, Blanchard and Flynn

ABSTRACT: A compound of the formula

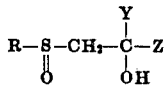

in which R is methyl or phenyl,
Y is H, substituted or unsubstituted phenyl or a heterocyclic radical,
Z is a substituted or unsubstituted phenyl or a heterocyclic radical, or $-\underset{|}{\overset{Y}{C}}-Z$ is a mono- or polycyclic radical.

The compounds are prepared by reacting

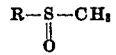

with an alkali metal amide, in anhydrous liquid ammonia, and then adding  Y—C—Z
              ‖
              O The compounds are useful as analgesics, antiinflammatory agents, antidepressants and CNS stimulants.

ALPHA-[(PHENYL SULFINYL)METHYL]-ALPHA-PHENYL DERIVATIVES OF PYRIDINEMETHANOLS

The present invention relates to novel sulfoxides, their process of preparation and their therapeutic application.
The novel sulfoxides correspond to the general formula:

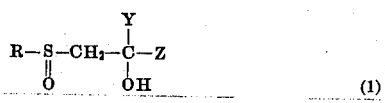

(1)

in which:
—R represents a methyl or phenyl radical;
—Y represents a hydrogen atom, an optionally substituted phenyl radical, or a heterocyclic radical;
—Z represents an optionally substituted phenyl radical, or a heterocyclic radical; or
—Y and Z may represent, together with the carbon atom to which they are attached, a mono- or polycyclic radical.

The process for the preparation of the sulfoxides of the general formula (1) comprises treating, in anhydrous liquid ammonia, a sulfoxide of the formula:

(2)

in which R has the same significance as in the formula (1) with an alkali metal amide, and then with a compound of the formula:

(3)

in which Y and Z have the same significance as in the formula (1).

Preferably, the sulfoxides of formula (1) are obtained by adding a compound of the formula (2) to sodium or lithium amide in anhydrous liquid ammonia, and then after agitation for 1 hour a compound of the formula (3) is added to the reaction medium. The agitation is maintained for 4 hours, the ammonia is evaporated and the mixture is hydrolyzed. The precipitate is extracted with chloroform and recovered by evaporation and crystallization.

The following preparations are given by way of nonlimitative examples illustrate the present invention.

EXAMPLE 1.
2-Methylsulfinyl-1-p-dimethylaminophenyl-1-ethanol.
7.8 g. (0.1 mole) of dimethylsulfoxide diluted in its own volume of ether is added to 3.9 g. (0.1 mole) of sodium amide in 100 ml. of anhydrous liquid ammonia. After agitation for 1 hour, 14.9 g. (0.1 mole) of p-dimethylaminobenzaldehyde is added to the reaction medium and the mixture is maintained under agitation for 4 hours. After evaporation of the ammonia, the reaction mixture is hydrolyzed and the precipitate is extracted with chloroform. The solvent is evaporated and the crude product obtained is recrystallized.
Melting point, after crystallization in ethyl acetate = 224° C.
Yield = 40 percent.
Empirical formula = $C_{11}H_{17}NO_2S$.
Elementary analysis:

|  | C | H | N | O | S |
|---|---|---|---|---|---|
| Calculated % | 58.12 | 7.54 | 6.16 | 14.08 | 14.10 |
| Found % | 58.08 | 7.54 | 6.20 | 13.88 | 14.27 |

EXAMPLE 2.
2-Methylsulfinyl-bis-1,1-(p-dimethylaminophenyl)-1-ethanol.
2-methylsulfinyl-bis-1,1-(p-dimethylaminophenyl)-1-ethanol has been prepared according to the method described in example 1, with the exception that p-dimethylaminobenzaldehyde is replaced by tetramethyl-p,p'-diaminobenzophenone.
Melting point, after crystallization in ethyl acetate = 170° C.
Yield = 46 percent.
Empirical formula = $C_{19}H_{26}N_2O_2S$.
Elementary analysis:

|  | C | H | N | O | S |
|---|---|---|---|---|---|
| Calculated % | 65.86 | 7.56 | 8.09 | 9.24 | 9.25 |
| Found % | 66.12 | 7.51 | 7.91 | 9.55 | 9.54 |

EXAMPLE 3.
2-Methylsulfinyl-1-phenyl-1-(2'-thienyl)-1-ethanol.
2-methylsulfinyl-1-phenyl-1-(2'-thienyl)-1-ethanol has been prepared according to the method described in example 1, with the exception that p-dimethylaminobenzaldehyde is replaced by 2-phenylthienyl ketone.
Melting point, after crystallization in benzene = 138° C.
Yield = 31 percent.
Empirical formula = $C_{13}H_{14}O_2S_2$.
Elementary analysis:

|  | C | H | O | S |
|---|---|---|---|---|
| Calculated % | 58.61 | 5.30 | 12.01 | 24.08 |
| Found % | 58.68 | 5.24 | 12.13 | 23.86 |

EXAMPLE 4.
5-Methylsulfinylmethyl-5-hydroxy-dibenzocycloheptadiene.
5-methylsulfinylmethyl-5-hydroxy-dibenzocycloheptadiene has been prepared according to the method described in example 1 with the exception that p-dimethylaminobenzaldehyde is replaced by 5-dibenzocycloheptadienone.
Melting point, after crystallization in ethyl acetate = 158° C.
Yield = 50 percent.
Empirical formula = $C_{17}H_{18}O_2S$.
Elementary analysis:

|  | C | H | O | S |
|---|---|---|---|---|
| Calculated % | 71.29 | 6.34 | 11.17 | 11.20 |
| Found % | 71.43 | 6.35 | 11.30 | 11.07 |

EXAMPLE 5.
2-Phenylsulfinyl-1-p-dimethylaminophenyl-1-ethanol.
14 g. (0.1 mole) of methylphenylsulfoxide diluted in its own volume of ether is added to 3.9 g. (0.1 mole) of sodium amide in 100 ml. of anhydrous liquid ammonia. After agitation for 1 hour, 14.9 g. (0.1 mole) of p-dimethylaminobenzaldehyde is added to the reaction medium and the mixture is maintained under agitation for 4 hours. After evaporation of the ammonia, the reaction mixture is hydrolyzed and the precipitate is extracted with chloroform. The solvent is evaporated and the crude product obtained is recrystallized.
Melting point, after crystallization in ethyl acetate = 118° C.
Yield = 20 percent.
Empirical formula = $C_{16}H_{19}NO_2S$.
Elementary analysis:

|  | C | H | N | O | S |
|---|---|---|---|---|---|
| Calculated % | 66.40 | 6.62 | 4.84 | 11.06 | 11.08 |
| Found % | 66.60 | 6.57 | 5.08 | 11.10 | 11.16 |

EXAMPLE 6.
2-Phenylsulfinyl-1,1-diphenyl-1-ethanol.
2-phenylsulfinyl-1,1-diphenyl-1-ethanol has been prepared according to the method described in example 5, with the exception that p-dimethylamino-benzaldehyde is replaced by benzophenone.
Melting point, after crystallization in ethyl acetate = 152° C.
Yield = 68 percent.
Empirical formula = $C_{20}H_{18}O_2S$.
Elementary analysis:

|  | C | H | O | S |
|---|---|---|---|---|
| Calculated % | 74.50 | 5.63 | 9.92 | 9.95 |
| Found % | 74.27 | 5.74 | 10.12 | 10.12 |

EXAMPLE 7.
2-Phenylsulfinyl-1-(2'-thienyl)1-ethanol has been prepared according to the method described in example 5, with the exception that p-dimethylaminobenzaldehyde is replaced by 2-phenylthienylketone.
Melting point, after crystallization in ethyl acetate = 154° C.

Yield = 47 percent.
Empirical formula = $C_{18}H_{16}O_2S_2$.
Elementary analysis:

|  | C | H | O | S |
|---|---|---|---|---|
| Calculated % | 65.82 | 4.91 | 9.74 | 19.53 |
| Found % | 65.96 | 4.91 | 9.88 | 19.73 |

EXAMPLE 8.

2-Phenylsulfinyl-1-phenyl-1-(3'-pyridyl)-1-ethanol.

2-phenylsulfinyl-1phenyl-1-(3'-pyridyl)-1-ethanol has been prepared according to the method described in example 5, with the exception that p-dimethylaminobenzaldehyde is replaced by 3-benzoyl-pyridine.

Melting point, after crystallization in ethyl acetate = 142° C.
Yield = 46 percent.
Empirical formula = $C_{19}H_{17}NO_2S$.
Elementary analysis:

|  | C | H | N | O | S |
|---|---|---|---|---|---|
| Calculated % | 70.56 | 5.30 | 4.33 | 9.89 | 9.92 |
| Found % | 70.37 | 5.31 | 4.52 | 10.03 | 9.73 |

EXAMPLE 9.

2-Phenylsulfinyl-1-phenyl-1-(4'-pyridyl)-1-ethanol.

2-phenylsulfinyl-1-phenyl-1-(4'-pyridyl)-1-ethanol has been prepared according to the method described in example 5, with the exception that p-dimethylaminobenzaldehyde is replaced by 4-benzoyl-pyridine.

Melting point, after crystallization in 95° ethanol = 160° C.
Yield = 43 percent.
Empirical formula = $C_{19}H_{17}NO_2S$.
Elementary analysis:

|  | C | H | N | O | S |
|---|---|---|---|---|---|
| Calculated % | 70.56 | 5.30 | 4.33 | 9.89 | 9.92 |
| Found % | 70.32 | 5.47 | 4.29 | 10.18 | 9.92 |

EXAMPLE 10.

1Phenylsulfinylmethyl-1-cyclohexanol.

1-phenylsulfinylmethyl-1-cylcohexanol has been prepared according to the method described in example 5, with the exception that p-dimethylaminobenzaldehyde is replaced by cyclohexanone.

Melting point, after crystallization in isopropyl ether = 98° C.
Yield = 13 percent.
Empirical formula = $C_{13}H_{18}O_2S$.
Elementary analysis:

|  | C | H | O | S |
|---|---|---|---|---|
| Calculated % | 65.51 | 7.61 | 13.43 | 13.45 |
| Found % | 65.24 | 7.65 | 13.61 | 13.32 |

EXAMPLE 11.

9-Phenylsulfinylmethyl-9-hydroxyfluorene.

9-phenylsulfinylmethyl-9-hydroxyfluorene has been prepared according to the method described in example 5, with the exception that p-dimethylaminobenzaldehyde is replaced by 9-fluorenone.

Melting point, after crystallization in benzene = 178° C.
Yield = 28 percent.
Empirical formula = $C_{20}H_{16}O_2S$.
Elementary analysis:

|  | C | H | O | S |
|---|---|---|---|---|
| Calculated % | 74.97 | 5.03 | 9.99 | 10.01 |
| Found % | 75.02 | 4.97 | 9.93 | 9.93 |

EXAMPLE 12.

5-Phenylsulfinylmethyl-5-hydroxy-dibenzocycloheptadiene.

5-phenylsulfinylmethyl-5-hydroxy-dibenzocycloheptadiene has been prepared according to the method described in example 5, with the exception that p-dimethylaminobenzaldehyde is replaced by 5-dibenzocycloheptadienone.

Melting point, after crystallization in ethyl acetate = 146° C.

Yield = 28 percent.
Empirical formula = $C_{22}H_{20}O_2S$.
Elementary analysis:

|  | C | H | O | S |
|---|---|---|---|---|
| Calculated % | 75.83 | 5.79 | 9.18 | 9.20 |
| Found % | 75.77 | 6.03 | 9.36 | 9.37 |

The isolated compounds are all crystalline and are insoluble in water. They present in infrared a frequency towards 1,040 cm.$^{-1}$ can be attributed to a sulfoxide group, and a frequency towards 3,240 cm.$^{-1}$ due to an alcohol function.

Tested on animals in the laboratory, the sulfoxides of the general formula (1) have shown:

a. that they are capable of protecting mice against the torsions and painful stretchings provoked by the intraperitoneal injection of acetic acid;

b. that they possess the property of reducing the inflammation resulting from the under-plantar injection of a phlogogene agent such as carraghenine on mice.

By way of example, 2-methylsulfinyl-1-phenyl-1-(2'-thienyl)-1-ethanol, which has a DL 50, by oral means, on mice, of the order of 650 mg./kg., exerts a significant analgesic effect in a dose of 100 mg./kg. and a significant antiinflammatory effect in a dose of 200 mg./kg. in the experimental conditions described above and by oral means.

Similarly, 5-methylsulfinylmethyl-5-hydroxy-dibenzocycloheptadiene, which does not exert an acute toxicity effect with a dose of 2 g./kg. by oral means on mice, is capable of exerting on the same animal and by the same means, a significant analgesic and anti-inflammatory effect with 200 mg./kg.

c. that they exert an antagonism against the experimental effects of reserpine, namely on the ptosis provoked by this substance on mice and the gastric ulcerations that this substance produces on the rat.

By way of example, 2-phenylsulfinyl-1-p-dimethylaminophenyl-1-ethanol has a DL 50, by oral means, on mice of the order of 1,500 mg./kg., and is active on the two syndromes in a dose of 50 mg./kg. by oral means.

d. that they are capable of producing a hypermotility in mice. This action has been evidenced in the course of evasion tests.

By way of example, 2-phenylsulfinyl-1-phenyl-1-(4'-pyridyl)-1-ethanol has a DL 50, by oral means, on mice of the order of 3.5 g./kg., and augments by 93 percent the number of sorties on the enclosed inclined plane evasion test with a dose of 100 mg./kg. by oral means.

The sulfoxides of formula (1) possess an analgesic and anti-inflammatory activity as well as an antidepressive and stimulating action on the central nervous system.

As a result of the preceding tests, the difference between the pharmacologically active dose and the lethal dose is sufficiently large to permit the utilization of the compounds of formula (1) in therapeutics.

These compounds have been shown to be suitable for the treatment of rheumatismal suffering, states of depression, asthenia, apathy and fatigue.

They can be administered in the form of tablets, capsules, gelules or suppositories in doses of 50 to 500 mg. of active ingredient as well as pommades containing 0.5 to 10 percent active ingredient.

What we claim is:

1. A compound of the formula

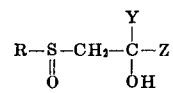

in which R is phenyl,
Y is, phenyl
Z is pyridyl.

2. A compound according to claim 1, in which R is phenyl, Y is phenyl and Z is 3'-pyridyl or 4'-pyridyl.